United States Patent
Levoy et al.

(10) Patent No.: US 9,854,188 B2
(45) Date of Patent: Dec. 26, 2017

(54) CALIBRATION OF DEFECTIVE IMAGE SENSOR ELEMENTS

(71) Applicant: Google LLC, Mountain View, CA (US)

(72) Inventors: Marc Stewart Levoy, Stanford, CA (US); Roman Lewkow, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/972,075

(22) Filed: Dec. 16, 2015

(65) Prior Publication Data

US 2017/0180659 A1 Jun. 22, 2017

(51) Int. Cl.
*H04N 5/367* (2011.01)
*H04N 5/232* (2006.01)
*H04N 17/00* (2006.01)
*G06T 3/40* (2006.01)

(52) U.S. Cl.
CPC .......... *H04N 5/367* (2013.01); *G06T 3/4038* (2013.01); *H04N 5/23212* (2013.01); *H04N 17/002* (2013.01); *G06T 2200/32* (2013.01); *G06T 2207/10024* (2013.01); *G06T 2207/10148* (2013.01); *G06T 2207/20221* (2013.01)

(58) Field of Classification Search
CPC .. H04N 5/367; H04N 5/23212; H04N 17/002; G06T 3/4038; G06T 2207/10024; G06T 2200/32; G06T 2207/10148; G06T 2207/20221
See application file for complete search history.

(56) References Cited

U.S. PATENT DOCUMENTS

| 7,711,259 B2 * | 5/2010 | Daley ........................ G06T 5/50 396/89 |
| 8,879,869 B2 | 11/2014 | Zamfir et al. |
| 2007/0122056 A1 | 5/2007 | Steinberg et al. |
| 2010/0141810 A1 | 6/2010 | Wang et al. |
| 2010/0231727 A1 | 9/2010 | Steinberg et al. |
| 2013/0182934 A1 | 7/2013 | Topfer et al. |
| 2014/0092279 A1 | 4/2014 | Ovsiannikov |

FOREIGN PATENT DOCUMENTS

| KR | 10-2005-0092595 | 9/2005 |
| KR | 10-2015-0097987 | 8/2015 |

* cited by examiner

*Primary Examiner* — Twyler Haskins
*Assistant Examiner* — Angel L Garces-Rivera
(74) *Attorney, Agent, or Firm* — McDonnell Boehnen Hulbert & Berghoff LLP

(57) ABSTRACT

The present disclosure relates to methods and systems that may reduce pixel noise due to defective sensor elements in optical imaging systems. Namely, a camera may capture a burst of images with an image sensor while adjusting a focus distance setting of an optical element. For example, the image burst may be captured during an autofocus process. The plurality of images may be averaged or otherwise merged to provide a single, aggregate image frame. Such an aggregate image frame may appear blurry. In such a scenario, "hot" pixels, "dead" pixels, or otherwise defective pixels may be more easily recognized and/or corrected. As an example, a defective pixel may be removed from a target image or otherwise corrected by replacing a value of the defective pixel with an average value of neighboring pixels.

20 Claims, 15 Drawing Sheets

201C
Back view

Side view

Top view

CALIBRATION OF DEFECTIVE IMAGE SENSOR ELEMENTS

BACKGROUND

Optical imaging systems may be employed as standalone hardware devices or integrated into other types of devices. For instance, still and video cameras are now regularly included in wireless computing devices (e.g., smartphones and tablets), laptop computers, video game interfaces, home automation devices, and even automobiles and other types of vehicles.

Optical imaging systems include image sensors that may utilize millions of sensor elements, or more. Sensor elements may malfunction due to fabrication imperfections or other factors. For example, some sensor elements may provide permanent or intermittent high, low, or fixed values independent of the light impinging on them through the optical imaging system. Some sensor elements may report values that are proportional to incident light, but that are corrupted by excessive levels of light-independent signal accumulating in the element during the exposure time. Furthermore, sensor elements may become occluded by, for example, a dust particle. The output of such sensor elements may lead to corresponding "dead," "stuck," "hot," or obstructed pixels in images captured by the optical imaging system.

Image calibration processes may be performed to identify such abnormal sensor elements to make it possible to reduce or remove the effect of such image-degrading effects. For example, a camera calibration process may include capturing an image with a lens cap over the optical path to more easily identify "hot" pixels from a dark background image. However, such calibration processes may be limited to factory testing, may require the interaction of a user and/or may only be limited to identification of hot pixels.

SUMMARY

Systems and methods disclosed herein relate to a calibration technique that may be applied to compensate a broad range of sensor element problems.

In an aspect, an optical imaging system is provided. The optical image system includes an image sensor, an optical element, and a controller. The image sensor includes a plurality of sensor elements. The sensor elements are configured to represent respective pixels in captured images. The optical element is coupled to the image sensor and configured to define a focus distance setting of the captured images. The controller includes a memory and at least one processor. The processor is configured to execute instructions stored in the memory so as to carry out operations. The operations include causing the image sensor to capture a plurality of images. The images are captured with different respective focus distance settings defined by the optical element. The operations include combining the plurality of images into an aggregate image and, based on the aggregate image, determining a condition of a particular sensor element of the plurality of sensor elements. The operations also include causing the image sensor to capture a payload image. The operations yet further include adjusting, in the payload image, a value of a particular pixel that is associated with the particular sensor element.

In an aspect, a method is provided. The method includes capturing a plurality of images via an image sensor. The image sensor includes a plurality of sensor elements. The sensor elements are configured to represent respective pixels in the captured plurality of images. The method also includes, while capturing the plurality of images, adjusting at least one property of an optical element. The optical element is coupled to the image sensor. The method further includes combining the plurality of images into an aggregate image and, based on the aggregate image, determining a condition of a particular sensor element of the plurality of sensor elements. The method yet further includes adjusting, in a payload image, a value of a particular pixel that is associated with the particular sensor element.

In an aspect, a system may include various means for carrying out the operations of the other respective aspects described herein.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

I. Overview

Figure 1:
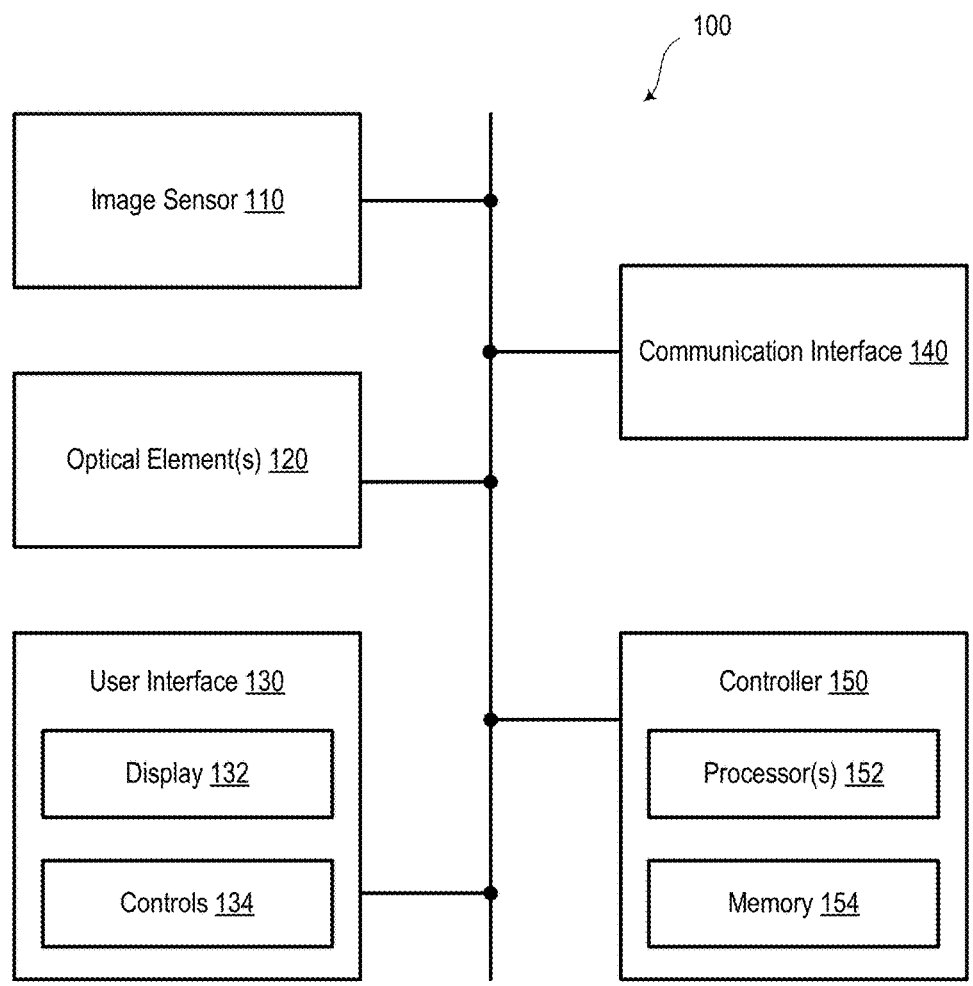
FIG. 1 illustrates an optical imaging system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

The present disclosure relates to methods and systems for detecting and correcting defects in captured images. Such defects may arise from imperfections in image sensor elements. For example, "hot" pixels are a class of structural and/or electrical defects common in image sensors. Hot pixels are caused by impurities in the base materials of image sensors as well as imperfections introduced during the fabrication process. The impurities and imperfections may lead to increased dark current leakage in the photodetector. Hot pixels manifest themselves as sensor elements with abnormal levels of photodetector current even when not illuminated, e.g., high dark current. These sensor elements may correspond to pixels in a captured image that appear brighter than the surrounding normal pixels. Similarly, dead pixels manifest themselves as sensor elements with zero or abnormally low photodetector current, even when illuminated. Such sensor elements may correspond to pixels in a captured image that appear darker than surrounding normal pixels. In some cases, defective sensor elements may be permanently or intermittently stuck at high (white), low (black), or an intermediate (grey) level.

Defective sensor elements degrade captured image quality. However, the effects of such defects may be corrected during image processing typically by replacing the value of a pixel that corresponds to a defective sensor element with an estimated or average value of neighboring pixels. In order to perform such corrections, locations of these defective pixels need to be ascertained.

One way of detecting defective sensor elements from an image is to capture a dark image (dark to keep photocurrent from incident illumination at low levels) at long exposure times (so as to maximize the accumulated charge of leaky sensor elements), often at elevated device temperature (so as to increase the leakage current and again maximize the accumulated charge). Capturing a dark image typically requires the ability (e.g., an optical shutter) to block the light coming in through the lens. However, physical shutters are not generally available in mobile device cameras due to space and cost limitations.

Another possible approach is to capture an illuminated image with the lens removed (or a diffusing element placed in front of the imaging lens) so as to blur out any scene features and make abnormal pixels stand out. However, this method is impractical in mobile devices, which generally have fixed lenses that cannot be removed.

Alternatively, hot pixels may be identified during manufacturing tests and stored as calibration data for a given image sensor. However, it is also desirable to perform a field calibration of the hot pixels after the device has been shipped to the user, as sensor element behavior is known to change over time (e.g., sensor elements may fail over time or may change their characteristics intermittently). As such, conventional mobile device cameras do not provide a satisfactory method to perform such recalibration in the field due to the lack of an optical shutter in the optical path.

The disclosed systems and methods offer an alternative way to identify and compensate for hot pixels and other cosmetic defects. A series of images may be captured, each image of which is captured at a different focus distance setting of a lens. For example, this image "burst" may be conveniently performed during an autofocus (AF) sweep. In some embodiments, the image burst may occur after an autoexposure (AE) process, which may provide image capture settings (e.g., exposure time, ISO, gain, etc.) selected to prevent saturation and/or underexposure of a given scene.

The series of images may be averaged or otherwise combined to provide an aggregate image. Due to field of view scaling at different focus distance setting and also that each of the images is captured at a different focus setting, the aggregate image will likely be blurry and devoid of sharp features. In such a scenario, hot pixels and other abnormal pixels, not subject to lens blurring, will remain sharply defined against the blurry aggregate image. As such, an edge detection algorithm or another type of contrast-sensitive feature recognition algorithm may more effectively identify and map the abnormal sensor elements for later correction. The disclosed systems and methods make possible automatic recalibration of cosmetic defects of an image sensor in the field by efficiently using a set of images captured during the AF process. When the recalibration is performed on sufficiently illuminated scenes (as is usually the case during AF sweep), other types of cosmetic defects than hot pixels (e.g., dark pixels, dust particles) may also be detected.

The process disclosed herein need not depend on explicit user action. For example, the recalibration process may occur automatically during each AF sweep or periodically (e.g., every $10^{th}$ AF sweep or after powering up the camera). Additionally or alternatively, a user may perform this recalibration on command (e.g., via a menu, soft key, and/or shutter button). This calibration method may leverage computation imaging techniques based on burst capture and burst processing and may provide improvements in image quality from mobile device cameras.

II. Example Optical Imaging Systems

FIG. 1 illustrates an optical imaging system 100, according to an example embodiment. The optical imaging system 100, which may also be considered a camera, includes at least one image sensor 110, at least one optical element 120, a user interface 130, a communication interface 140, and a controller 150.

As used herein, a "camera" may refer to an individual image capture component, or a device that contains one or more image capture components, depending on the usage context.

The image sensor 110 may include a plurality of sensor elements for capturing images based on light received at each sensor element location. As such, the sensor elements may be configured to represent respective pixels in captured images. As described herein, the image sensor 110 may include an electronic image sensor (e.g., a charge coupled device (CCD) or a complementary metal-oxide-semiconductor (CMOS) sensor). As such, the image sensor 110 may include millions of individual photosensors or sensor elements. In an example embodiment, the image sensor 110 may be arranged in a 3:2 aspect ratio and may include 3,872×2,592 sensor elements, or approximately ten million sensor elements. However, many other image sensors with different aspect ratios and more or fewer sensor elements are contemplated. Such an image sensor may be operable to transfer and/or store captured images in a data storage unit (e.g., memory 154).

The optical element(s) 120 may include one or more lenses, which may be optically coupled to the image sensor 110. The one or more lenses may be configured to define a focus distance setting in a field of view of the image sensor 110. In other words, the one or more lenses may be adjustable to define the focus distance setting of images captured by the image sensor 110.

Additionally or alternatively, the optical element(s) 120 may include one or more apertures through which light enters and/or one or more lenses positioned in front of each aperture to focus at least part of the image onto the image sensor 110. The apertures may be fixed size or adjustable.

Additionally or alternatively, the optical element(s) 120 may include one or more shutters, which may be coupled to or nearby the lenses or image sensor 110. Each shutter may either be in a closed position, in which it blocks light from reaching the image sensor, or an open position, in which light is allowed to reach to image sensor. The position of each shutter may be controlled by a shutter button. For instance, a shutter may be in the closed position by default. When the shutter is triggered (e.g., by pressing the shutter button), the shutter may change from the closed position to the open position for a period of time, known as the shutter cycle. During the shutter cycle, an image may be captured from the image sensor. At the end of the shutter cycle, the shutter may change back to the closed position.

Alternatively, the shuttering process may be electronic. For example, before an electronic shutter of a CCD image sensor is "opened," the sensor may be reset to remove any residual signal in its photodiodes. While the electronic shutter remains "open", the photodiodes may accumulate charge. When or after the shutter "closes", the accumulated charges may be read out and results transferred to longer-term data storage. Combinations of mechanical and electronic shuttering may also be possible.

Regardless of type, a shutter may be activated and/or controlled by something other than a shutter button. For instance, the shutter may be activated by a softkey, a timer, or some other trigger. Herein, the term "image capture" may refer to any mechanical and/or electronic shuttering process that may result in one or more images being recorded, regardless of how the shuttering process is triggered or controlled.

In an example embodiment, the user interface 130 may function to allow optical imaging system 100 to interact with a human or non-human user, such as to receive input from a user and to provide output to the user. Thus, user interface 130 may include input components such as a keypad, keyboard, touch-sensitive or presence-sensitive panel, computer mouse, trackball, joystick, microphone, and so on. User interface 130 may also include one or more output components such as a display 132, which may be a multi-element touchscreen display. Other types of displays are possible and contemplated herein. The display 132 may be based on cathode ray tube (CRT), light emitting diode (LED), liquid crystal (LCD), plasma, or any other type of display technologies, or other technologies now known or later developed. User interface 130 may also be configured to generate audible and/or tactile output(s), via a speaker, speaker jack, audio output port, audio output device, earphones, vibrators, and/or other similar devices.

In some embodiments, user interface 130 may include a display that serves as a viewfinder for still camera and/or video camera functions supported by optical imaging system 100. Additionally, user interface 130 may include controls 134, which may include one or more buttons, switches, knobs, softkeys, and/or dials that facilitate the configuration and focusing of a camera function and the capturing of images (e.g., taking a picture). It may be possible that some or all of these buttons, switches, knobs, softkeys, and/or dials are implemented by way of a touchscreen interface or a presence-sensitive panel. Specifically, the controls 144 may include a shutter button and controls operable to adjust focus, field of view, zoom, shutter speed, aperture, and/or ISO, among many other possibilities.

The exposure of a captured image may be determined by a combination of the size of the aperture, the brightness of the light entering the aperture, and the length of the shutter cycle (also referred to as the shutter speed or the exposure length). In an example embodiment, the exposure may be controlled by a user of the optical imaging system 100. Additionally or alternatively, an AE process may provide information about lighting levels within a scene. Based on results of the AE process, some or all image capture settings (e.g., aperture, shutter speed, and/or ISO) may be automatically selected. Yet further, the optical imaging system 100 may include one or more exposure modes. Such exposure modes may allow automatic control of a given set of exposure parameters based on a result of the AE process while allowing a user to select one or more exposure parameters. For example, the optical imaging system 100 may include aperture priority, shutter priority, and/or other "program" modes for image capture under specific lighting and/or subject conditions.

Additionally, a digital and/or analog gain may be applied to the image and/or the sensor elements of the image sensor, thereby influencing the exposure. Adjusting the sensitivity of the image sensor may be represented by changing the ISO of the image capture device.

A still camera may capture one or more images each time image capture is triggered. A video camera may continuously capture images at a particular rate (e.g., 30 images—or frames—per second) as long as image capture remains triggered (e.g., while the shutter button is held down).

Cameras may include software to control one or more camera functions and/or settings, such as aperture size, exposure time, gain, and so on. Additionally, some cameras may include software that digitally processes images during or after when these images are captured.

The communication interface 140 may allow optical imaging system 100 to communicate, using analog or digital modulation, with other devices, access networks, and/or transport networks. Thus, communication interface 140 may facilitate circuit-switched and/or packet-switched communication, such as plain old telephone service (POTS) communication and/or Internet protocol (IP) or other packetized communication. For instance, communication interface 140 may include a chipset and antenna arranged for wireless communication with a radio access network or an access point. Also, communication interface 140 may take the form of or include a wireline interface, such as an Ethernet, Universal Serial Bus (USB), or High-Definition Multimedia Interface (HDMI) port. Communication interface 140 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 140. Furthermore, communication interface 140 may comprise multiple physical communication interfaces (e.g., a Wifi interface, a BLUETOOTH® interface, and a wide-area wireless interface).

The controller 150 may include a processor 152 and a memory 154. The processor 152 may include one or more general purpose processors—e.g., microprocessors—and/or one or more special purpose processors—e.g., image signal processors (ISPs), digital signal processors (DSPs), graphics processing units (GPUs), floating point units (FPUs), network processors, or application-specific integrated circuits (ASICs). Additionally or alternatively, the processor 152 may include at least one programmable in-circuit serial programming (ICSP) microcontroller. In some instances, special purpose processors may be capable of image processing, image alignment, and merging images, among other possibilities. The memory 154 may include one or more volatile and/or non-volatile storage components, such as magnetic, optical, flash, or organic storage, and may be integrated in whole or in part with the processor 152. Memory 154 may include removable and/or non-removable components.

Processor 152 may be capable of executing program instructions (e.g., compiled or non-compiled program logic and/or machine code) stored in memory 154 to carry out the various functions described herein. Therefore, memory 154 may include a non-transitory computer-readable medium, having stored thereon program instructions that, upon execution by optical imaging system 100, cause optical imaging system 100 to carry out any of the methods, processes, or operations disclosed in this specification and/or the accompanying drawings. The execution of program instructions by processor 152 may result in processor 152 using data provided by various other elements of the optical imaging system 100. Specifically, the controller 150 and the processor 152 may perform operations on image data captured via the image sensor 110. While FIG. 1 illustrates the controller 150 as being schematically apart from other elements of the optical imaging system 100, the controller 150 may be physically located at, or incorporated into, one or more elements of optical imaging system 100. For example, in an embodiment, the controller 150 may include a distributed computing network and/or a cloud computing network.

The controller 150 may be operable to carry out various operations as described herein. For example, the controller 150 may be operable to carry out an AE, or metering, process so as to determine and select appropriate shutter speed and image sensor sensitivity with which to capture the plurality of images.

Additionally, the controller 150 may cause the image sensor to capture a plurality of images. Specifically, the images may be captured with different respective focus distance settings defined by respective locations of an optical element 120 (e.g., a lens).

In some embodiments, the images may be captured while carrying out an AF operation with the optical imaging system 100. AF is a methodology used to focus an image capture component with little or no assistance from a user. AF may automatically select an area of a scene on which to focus, or may focus on a pre-selected area of the scene. AF software may automatically adjust the lens position of the image capture component until it determines that the image capture component is sufficiently well-focused on an object.

An example AF methodology is described below. This example, however, is just one way of achieving AF, and other techniques may be used within the scope of the present disclosure.

In contrast-based AF, an image or a plurality of images, from the image sensor, may be digitally analyzed. Particularly, the contrast in brightness between pixels (e.g., the difference between the brightness of the brightest pixel and the least-brightest pixel) is determined. In general, the higher this contrast, the better the image is in focus. After determining the contrast, the lens position is adjusted, and the contrast is measured again. This process repeats until the contrast is at least at some pre-defined value. Once this pre-defined value is achieved, an image of the scene is captured and stored.

Additionally or alternatively, multiple AF iterations may be applied. That is, an initial AF scan with widely-spaced focus positions may provide a rough estimation of a "good" focus position. However, subsequent scans with finer differences in focus position may be applied so as to iterate to a "better" or "best" focus position by attempting to find yet higher contrast values in the image as a whole or at/near the focus spot.

The image data from the image sensor 110 may be processed into a plurality of captured images. In an example embodiment, the captured digital images may be represented as a one-dimensional, two-dimensional, or multi-dimensional array of pixels. Each pixel may be represented by one or more values that may encode the respective pixel's color and/or brightness. For example, one possible encoding uses the YCbCr color model. In this color model, the Y channel may represent the brightness of a pixel, and the Cb and Cr channels may represent the blue chrominance and red chrominance, respectively, of the pixel. For instance, each of these channels may take values from 0 to 255. Thus, the brightness of a pixel may be represented by a 0 or a value near zero if the pixel is black or close to black, and by a 255 or a value near 255 if the pixel is white or close to white. However, the value of 255 is a non-limiting reference point, and some implementations may use different maximum values (e.g., 1023, 4095, etc.).

Other color models such as a red-green-blue (RGB) color model or a cyan-magenta-yellow (CMY) may be employed with the embodiments herein. Further, the pixels in an image may be represented in various file formats, including raw (uncompressed) formats, or compressed formats such as Joint Photographic Experts Group (JPEG), Portable Network Graphics (PNG), Graphics Interchange Format (GIF), and so on.

In an example embodiment, the optical imaging system 100 may be configured to capture image frames at a rate of 30 frames per second (FPS). However, optical imaging systems having greater or lesser frame rates are possible.

Additionally or alternatively, the optical imaging system 100 may include a "burst" capture mode having a burst frame rate. The burst frame rate may include a capture frame rate that is faster than normal over a brief period of time. For example, in a scenario in which the optical imaging system 100 has a "normal" frame rate of 30 FPS, the optical imaging system 100 may be operable to provide burst image data, which may include two sets of ten image frames (one set from each image capture system) captured consecutively at 60 FPS. Other burst image frame amounts and other burst frame rates are possible.

The controller 150 may be configured to combine the plurality of images into an aggregate image. That is, the plurality of images may be merged into a single aggregate image. Additionally or alternatively, an aggregate image may be generated for each color channel. In an example embodiment, the aggregate image may include an average of associated pixel values within the plurality of captured images. For example, for all (x, y) coordinates in the aggregate image, the pixel at location (x, y) in the aggregate image may be assigned an average value of pixels at location (x, y) in all captured images. As described elsewhere herein, the aggregate image may be blurry due to: a) adjusting a focus distance setting during multiple image capture; and b) field of view scaling or image "breathing", which slightly modifies the field of view of the optical imaging system 100 and slightly shifts locations of scene features in images recorded at different focus settings of the optical element.

Based on the aggregate image, the controller 150 may be operable to determine a condition of a particular sensor element of the plurality of sensor elements. In other words, the controller may be operable to determine particular hot, dead, stuck, or occluded sensor elements. This determination may be based on detecting presence of local contrast (sharpness) in a specific pixel location, indicating a local deviation in the pixel value due to sensor element characteristics, rather than incident illumination. Optionally, a sensor element condition map may be generated and/or updated based on this information. In such a scenario, the sensor element condition map may be associated with a current time (e.g., timestamped). As such, a historical record of the condition of sensor elements may be maintained and/or periodically updated based on carrying out the calibration processes described herein.

The controller 150 may be operable to cause the image sensor to capture a payload image. The payload image might or might not be one of the plurality of images captured during the AF process. In some embodiments, the payload image may be captured subsequent to completing an AF process (e.g., while the camera is in-focus). The payload image may be a single image, a series (burst) of consecutive images, or a video stream.

The controller 150 may be operable to adjust a value (e.g., a brightness, color value, etc.) of a pixel or pixels in the payload image associated with the particular hot, dead, stuck, and/or occluded sensor elements. That is, the controller 150 may adjust pixels from the payload image that had been previously mapped as defective or malfunctioning.

The adjustment of the value of a particular pixel may include replacing the value of the defective pixel with an average of the values of at least one neighboring pixel.

Figure 2A:
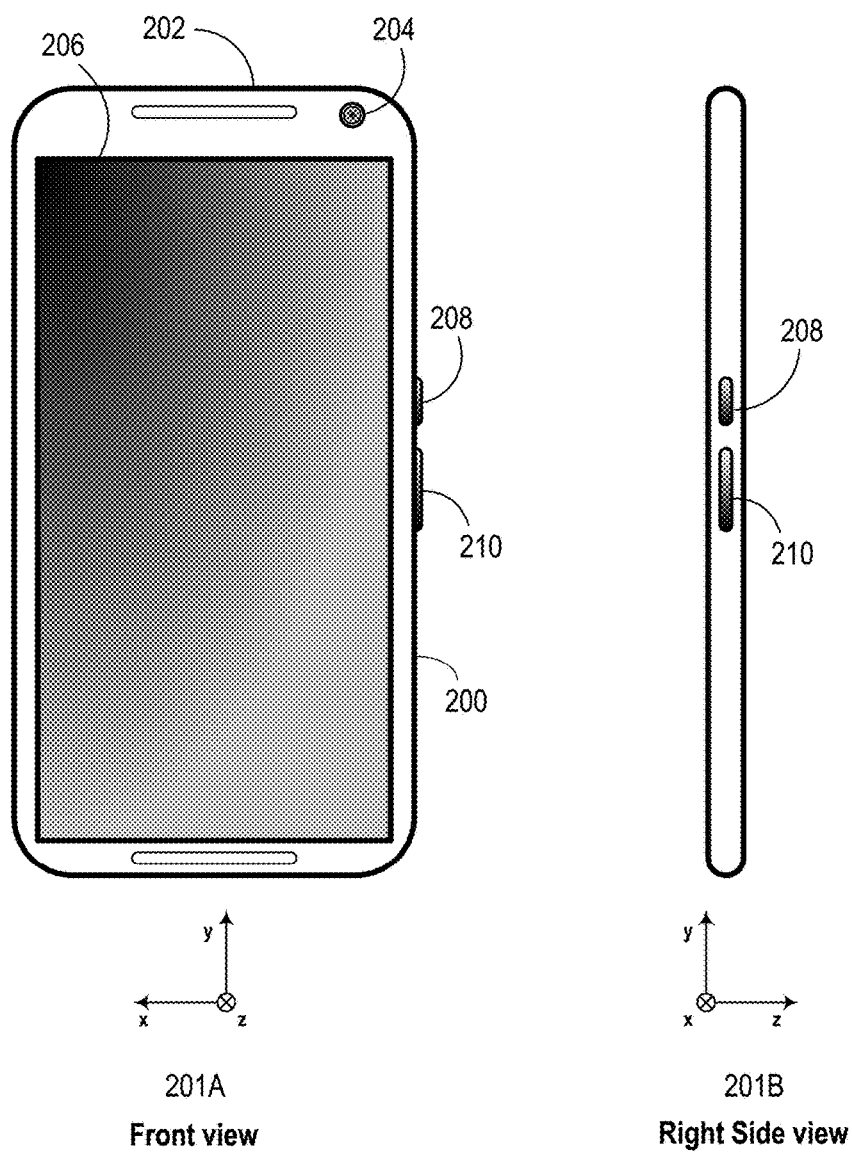
FIG. 2A illustrates front and right side views of a digital camera device, according to example embodiments.
Figure 2B:
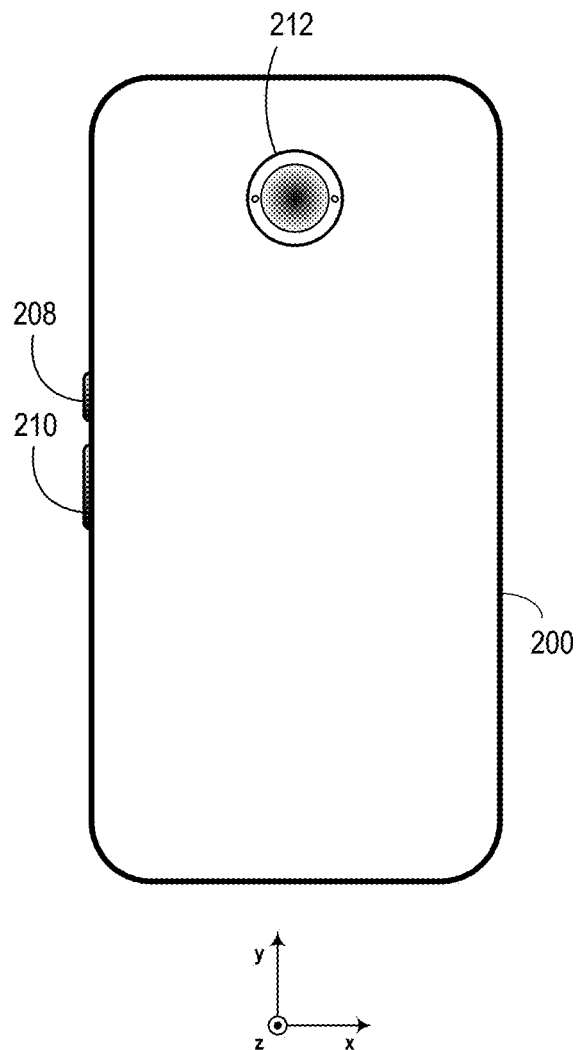
FIG. 2B illustrates a rear view of a digital camera device, according to example embodiments.

Optical imaging system 100 may be incorporated into other systems or devices. As an example, FIGS. 2A and 2B illustrate various views of a digital camera device 200. For example, FIG. 2A illustrates front and right side views of the digital camera device 200, according to example embodiments. Digital camera device 200 may be, for example, a mobile phone, a smartphone, a tablet computer, or a wearable computing device. However, other embodiments are possible. In an example embodiment, digital camera device 200 may include some or all of the elements of optical imaging system 100 as illustrated and described in relation to FIG. 1.

Digital camera device 200 may include various elements, such as a body 202, a front-facing camera 204, a multi-element display 206, a shutter button 208, and other buttons 210. Front-facing camera 204 may be positioned on a side of body 202 typically facing a user while in operation, or on the same side as multi-element display 206.

FIG. 2B illustrates a rear view (201C), of a digital camera device 200, according to example embodiments. As depicted in FIG. 2B, digital camera device 200 could further include a rear-facing camera 212. In such a scenario, the rear-facing camera 212 may be positioned on a side of body 202 opposite front-facing camera 204. Other arrangements are possible. Also, referring to the cameras as front facing or rear facing is arbitrary, and digital camera device 200 may include multiple cameras positioned on various sides of body 202.

Multi-element display 206 could represent a CRT display, a LED display, an LCD, a plasma display, or any other type of display. In some embodiments, multi-element display 206 may display a digital representation of the current image being captured by front-facing camera 204 and/or rear-facing camera 212, or an image that could be captured or was recently captured by any one or more of these cameras. Thus, multi-element display 206 may serve as a viewfinder for the cameras. Multi-element display 206 may also support touchscreen and/or presence-sensitive functions that may be able to adjust the settings and/or configuration of any aspect of digital camera device 200.

Front-facing camera 204 may include an image sensor and associated optical elements such as lenses. Front-facing camera 204 may offer zoom capabilities or could have a fixed focal length. In other embodiments, interchangeable lenses could be used with front-facing camera 204. Front-facing camera 204 may have a variable mechanical aperture and a mechanical and/or electronic shutter. Front-facing camera 204 also could be configured to capture still images, video images, or both.

Either or both of front facing camera 204 and rear-facing camera 212 may include or be associated with an illumination component that provides incident light to illuminate a target object. For instance, an illumination component could provide flash or constant illumination of the target object. An illumination component could also be configured to provide illumination that includes one or more of structured light, polarized light, and light with specific spectral content. Other types of illumination forms known and used to recover 3D models from an object are possible within the context of the embodiments herein.

One or more of front facing camera 204 and/or rear-facing camera 212 may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. The ambient light sensor may also be used to determine an exposure times for image capture. For example, the ambient light sensor may be operable to "meter" a scene so as to determine a shutter speed, aperture, and/or image sensor sensitivity.

Digital camera device 200 could be configured to use multi-element display 206 and either front-facing camera 204 or rear-facing camera 212 to capture images of a target object. For example, the multi-element display 206 may provide a preview of the image to be captured as well as provide a user interface with which to select exposure settings, trigger the image capture, etc. Additionally or alternatively, the multi-element display 206 may provide illumination during image capture. The captured images could be a plurality of still images or a video stream. The image capture could be triggered by activating shutter button 208, pressing a softkey on multi-element display 206, or by some other mechanism. Depending upon the implementation, the images could be captured automatically at a specific time interval, for example, upon pressing shutter button 208, upon appropriate lighting conditions of the target object, upon moving digital camera device 200 a predetermined distance, or according to a predetermined capture schedule.

As noted above, the functions of digital camera device 200—or another type of digital camera—may be integrated into a computing device, such as a wireless computing device, cell phone, tablet computer, laptop computer and so on. Furthermore, while FIGS. 2A and 2B illustrate a single front-facing camera 204 and a single rear-facing camera 212, alternative camera arrangements are possible. For example, multiscopic imaging systems are possible and contemplated herein. In an example embodiment, a plurality of rear-facing cameras may be arranged as a multiscopic array (e.g., a stereoscopic pair). Each of these cameras may be a distinct, independently-controllable image capture component, including an aperture, lens, image sensor, and shutter. In such a scenario, digital camera device 200 may instruct the rear-facing cameras to simultaneously capture respective monoscopic images of a scene, and may then use a combination of these monoscopic images to form a stereo image with depth.

Figure 3A:
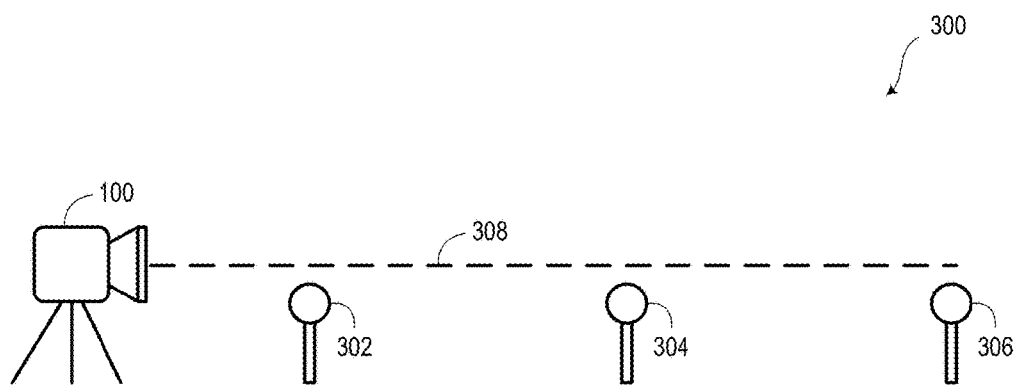
FIG. 3A illustrates an image capture scenario, according to an example embodiment.
Figure 3A:
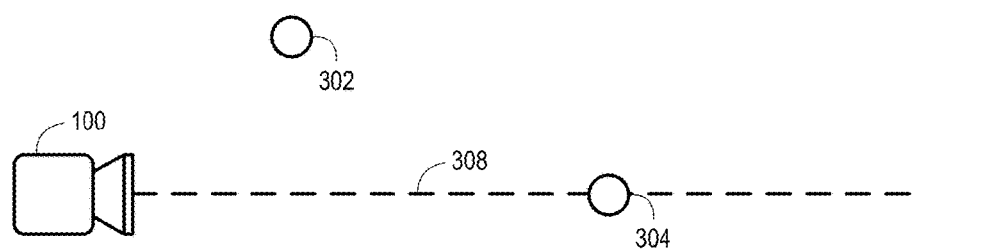
Figure 3A:

FIGS. 3A-3E illustrate various operational aspects of an optical imaging system according to an example embodiment. For example, FIG. 3A illustrates side and top views of an image capture scenario 300, according to an example embodiment. Image capture scenario 300 may include objects 302, 304, and 306, at near, medium, and distant locations, respectively, in relation to a camera such as the optical imaging system 100 as illustrated and described in relation to FIG. 1. Furthermore, objects 302, 304, and 306 may be arranged at locations left, centered, and right, respectively, in relation to an optical axis 308 of the optical imaging system 100.

Although FIG. 3A includes a scene that only includes objects 302, 304, and 306, it is understood that such a simplistic description is provided for brevity and explanatory purposes. The optical imaging system 100 may be configured to capture more complex scenes. For example, the optical imaging system 100 may be configured to image a variety of different scenes that may include any number of objects or features (or lack of such objects or features).

Figure 3B:
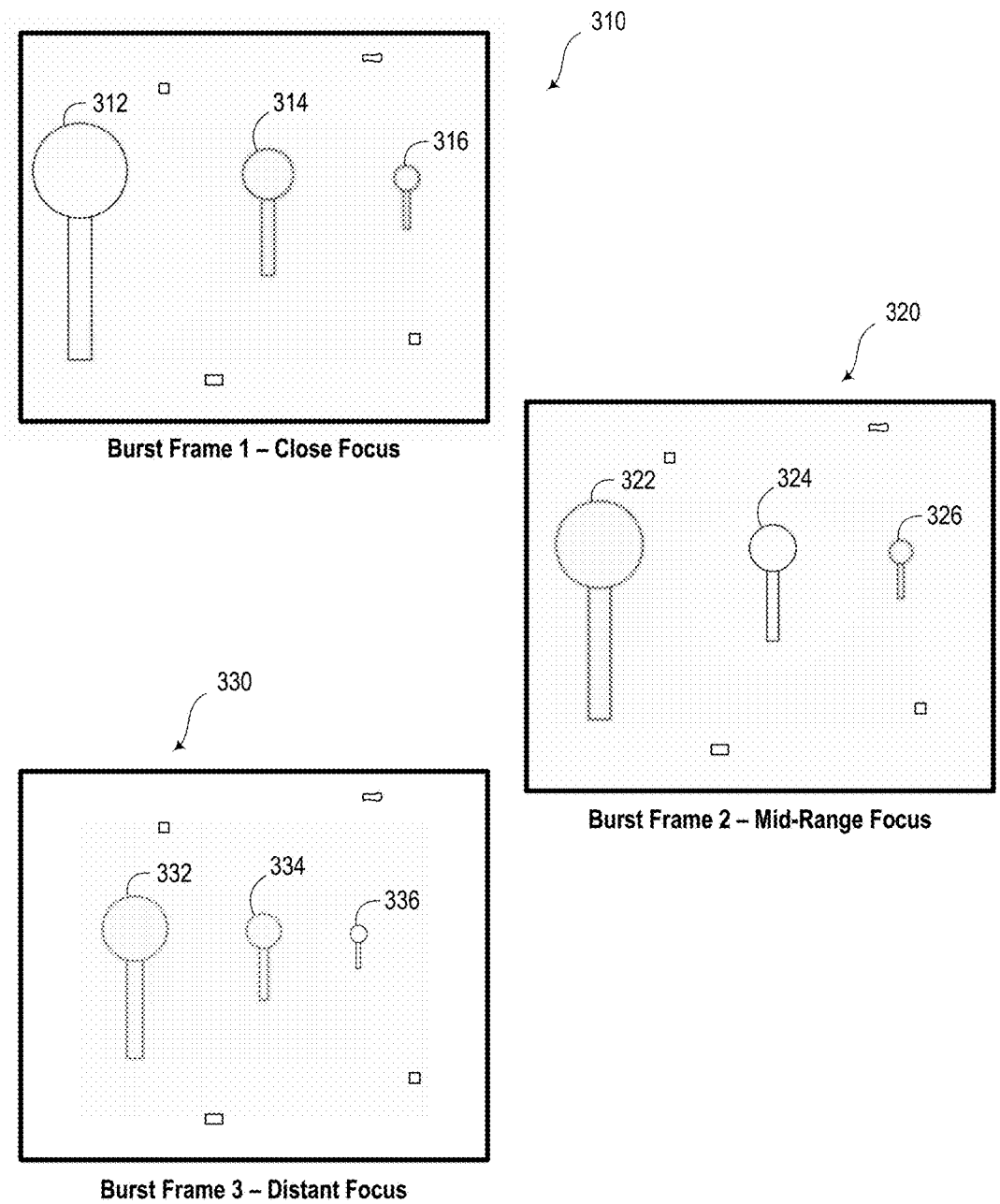
FIG. 3B illustrates a plurality of images, according to an example embodiment.

FIG. 3B illustrates a plurality of images captured by optical imaging system 100, according to an example embodiment. The captured images may represent image frames captured in image capture scenario 300 as illustrated and described in relation to FIG. 3A. In an example embodiment, a plurality of images, or an image burst, may be captured with the optical element at different focus distance settings while the optical imaging system 100 is carrying out an AF process. Each image of the plurality of images may include defective and/or occluded sensor elements. However, such sensor elements may be difficult to identify based on pixel values from a single image. In such a scenario, the AF process may include capturing several images while adjusting the focus distance setting from a close focus distance to a distant focus distance. For example, while capturing a first frame 310, a focus distance setting of an optical element (e.g., at least one lens) may correspond to a close focus position. As such, object 302 (the object closest to the optical imaging system 100) may be represented in the first frame 310 as in-focus object 312, while objects 304 and 306 may be represented in first frame 310 as out-of-focus objects 314 and 316, respectively. The first frame 310 may have a first field of view based on the focus distance setting being a close focus position.

While capturing a second frame 320, a focus position of the optical element may correspond to a middle, or medium distance, focus position. As such, object 304 (the medium distance object) may be represented in the second frame 320 as in-focus object 324, while objects 302 and 306 may be represented in second frame 320 as out-of-focus objects 322 and 326, respectively. The second frame 320 may have a second field of view based on the focus distance setting being a medium distance position.

While capturing a third frame 330, a focus position of the optical element may correspond to a distant, or infinity, focus position. As such, object 306 (the distant object) may be represented in the third frame 330 as in-focus object 336, while objects 302 and 304 may be represented in third frame 330 as out-of-focus objects 332 and 334, respectively. The third frame 330 may have a third field of view based on the focus distance setting being a distant position.

In addition, as illustrated in FIG. 3B, each of the focus positions assumed by the optical element 120 produces a different optical magnification factor, leading to a different field of view at each focus position. This phenomenon is commonly referred to as "focus breathing". The consequence of this behavior is that fine features of the scene objects 302, 304, 306 projected by the optical element onto the image sensor change their location in the captured image depending on the focus setting. (Later on, when these captured images are combined (e.g., averaged) together, this misalignment of fine features leads to blurring of these features in the aggregate image 340.

It is understood that the image frames 310, 320, and 330 are provided for illustrative purposes only and that more or fewer image frames may be captured according to the systems and methods described herein. Furthermore, captured image frames need not include any in-focus objects within the field of view. That is, the captured image frames need not be in-focus, in whole or part.

Figure 3C:
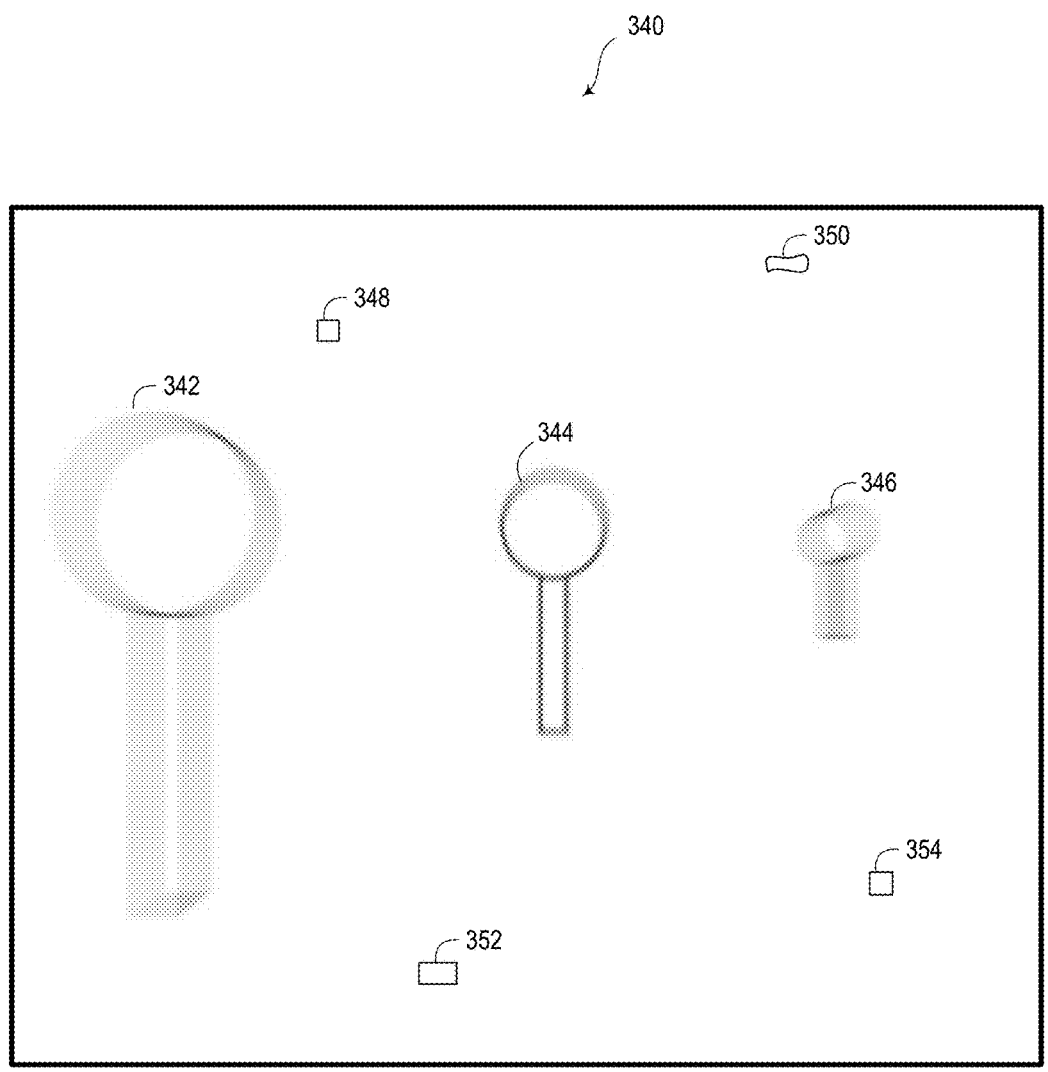
FIG. 3C illustrates an aggregate image, according to an example embodiment.

FIG. 3C illustrates an aggregate image 340, according to an example embodiment. The aggregate image 340 may be formed by combining corresponding pixels from the plurality of images (e.g., first image 310, second image 320, and third image 330). Combining pixels from the plurality of images may include a pixel-by-pixel combination of images. Additionally or alternatively, corresponding tile or grid portions of the respective images may be added, multiplied, and/or averaged to provide the aggregate image 340. Other methods may be used to combine or aggregate pixels from a plurality of captured images.

In an example embodiment, the aggregate image 340 may include blurry features. The blurriness introduced into scene features by aggregating images captured while running an AF sweep may be due at least to: a) causing a field of view the image to scale (e.g., "breathe") slightly while changing focus; and b) capturing defocused objects in the scene based on the focus position and object depth. Both of these effects may cause aggregated image features to blur if the plurality of images is captured while adjusting focus position, even if some objects are in-focus in some respective image frames of the plurality of images.

In an example embodiment, blurry objects 342, 344, and 346 may appear in the aggregate image 340, which may be blurred representations of objects 302, 304, and 306, respectively. Additionally, some sharp (e.g., not blurry or, at least, less blurry) objects may be evident in the scene. For example, image feature 348 may relate to a defective sensor element causing a hot pixel. Image feature 350 may include a dust particle directly on the surface of the image sensor. In other words, the dust particle may occlude one or more sensor elements, which may result in a dark-looking shape. The shape may resemble dust (e.g., a fiber or other type of recognizable particle) and may appear sharp (e.g., in-focus) depending on which optical element the dust is actually coupled or affixed to. Image feature 352 may include a defective sensor element causing a dead, or dark, pixel. Furthermore, image feature 354 may include a defective sensor element causing a "stuck" or permanently grey-level pixel.

The image features 348, 350, 352, and 354 may appear sharp, or in-focus, at least for the reason that their inclusion in the aggregate image 340 is not based substantially on a focus position of an optical element. That is, the image features 348, 350, 352, and 354 may be due to sensor-element level defects or occlusion. Such defects are not subject to optical blur due to mis-focus and do not change their position within individual images due to the optical magnification change ("breathing"). As such, the pixel-level representation of such image features may appear substantially in-focus in the aggregate image 340.

The respective image features may be determined based on an edge-detection algorithm, a contrast-detection algorithm, or another shape/image recognition algorithm. In an example embodiment, sharp image features may be detected via search-based and/or zero-crossing edge detection methods. Furthermore, Canny edge detection, differential edge detection, and Canny-Deriche edge detection algorithms are all specifically contemplated herein.

Generally, the image recognition algorithm may be operable to identify pixels, or a cluster of pixels, in the aggregate image 340 that have a brightness level (or a collective brightness level) deviating in a significant way from that of neighboring pixels. For example, the image features may be identified based on a difference in brightness level, compared to that of neighboring pixels, being different by more than a threshold level. In an example embodiment, a brightness threshold level may be 50 levels of brightness in a given color channel. As such, if a given pixel in the aggregate image 340 is equal to or more than 50 brightness levels brighter or darker than adjacent and/or neighboring pixels, the given pixel and corresponding sensor element may be identified as defective and/or occluded. It is understood that other threshold levels are possible. For example, the threshold level may be 25 brightness levels, or 250 brightness levels. Lower threshold values may include an increasing portion of the sensor elements. Accordingly, in some cases, image sharpness may be negatively affected by over-inclusion of sensor elements. Accordingly, in some embodiments, the threshold level may be adjustable based on a desired or selected level of compensation. Further, a plurality of threshold levels may be adjustable so as to compensate for sensor elements associated with various color channels. In some embodiments, the threshold level for a given pixel may vary based on noise levels of neighboring pixels, and/or a sensor element noise model.

For example, the given pixel may have a brightness level of 200 and its eight closest neighboring pixels each have a brightness level of 150 or less. In the scenario above with a threshold level of 50 brightness levels, the given pixel may be identified as being a hot or stuck pixel based on a difference of the relative brightness levels being equal or greater than the threshold level difference.

As used herein, "neighboring" pixels may include "nearest-neighbor" (e.g., directly adjacent) pixels. Additionally or alternatively, neighboring pixels may include one or more pixels within a finite distance from the pixel or pixels determined to be dead, hot, stuck, and/or occluded (e.g., 2 to 5 pixels away).

In some embodiments, the nature of defective/occluded sensor elements may be further investigated by observing an output of the given sensor element during an AE series. For example, the output of the given sensor element may provide information indicative of whether the sensor element is a dead element, a hot element, or a non-defective element. Namely, if the sensor element does not respond to light similarly to neighboring elements, it may be considered a dead sensor element.

Figure 3D:
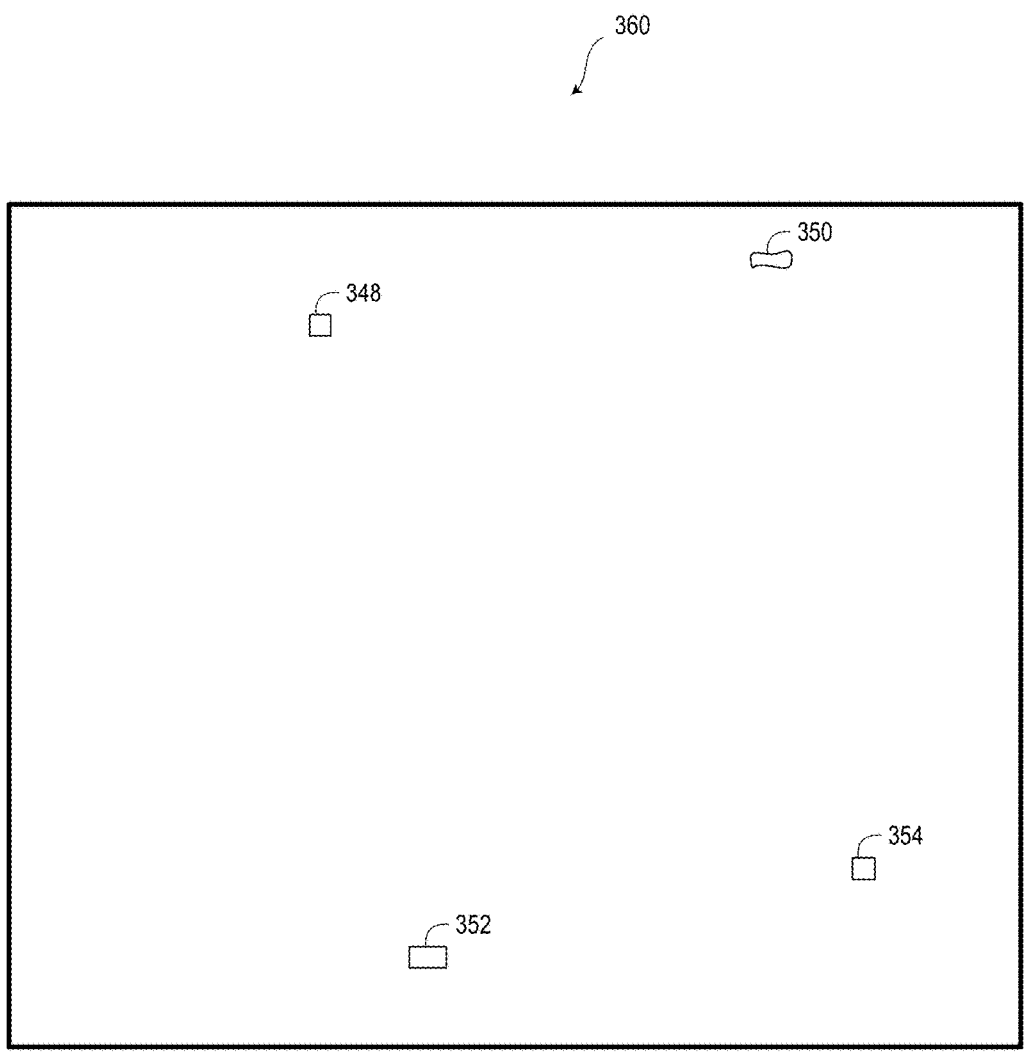
FIG. 3D illustrates a sensor element condition map, according to an example embodiment.

FIG. 3D illustrates a sensor element condition map 360, according to an example embodiment. The sensor element condition map 360 may include information indicative of locations and corresponding conditions of defective and/or occluded sensor elements of the image sensor. That is, as a result of determining a condition of the respective sensor element (e.g., dead, hot, stuck, and/or occluded), the condition may be added to the sensor element condition map 360, which may be a real-time and/or historical map of the condition of some or all of the sensor elements on the image sensor.

Figure 3E:
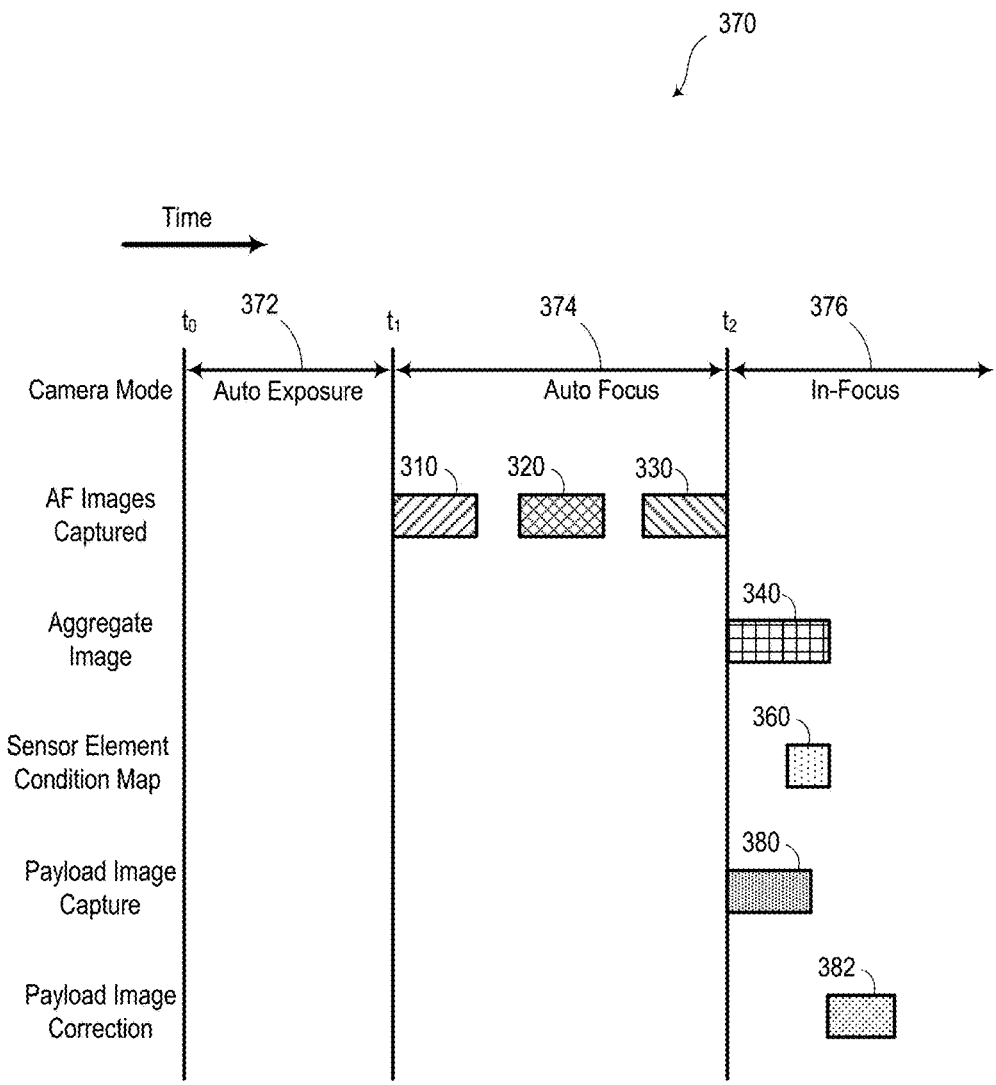
FIG. 3E illustrates an image capture scenario, according to an example embodiment.

FIG. 3E illustrates an image capture scenario 370, according to an example embodiment. Image capture scenario 370 may provide a partial timeline for some or all of the events illustrated and described in relation to FIGS. 3A-3D. For example, image capture scenario 370 may include an AE process 372, which may take place between $t_0$ and $t_1$. As a result of the AE process 372, some or all exposure settings may be selected based on light conditions, user settings, and/or camera settings.

The image capture scenario 370 may include an AF process 374, which may take place between $t_1$ and $t_2$. During the AF process 374, a plurality of images (e.g., first frame 310, second frame 320, and third frame 330) may be captured while moving an optical element (e.g., a lens). Accordingly, each of the plurality of images may be captured at a different focus distance setting. After the AF process 374, the camera may be considered to be "in-focus" with respect to a given focus spot and/or scene.

Subsequent to capturing the plurality of images, the aggregate image 340 may be processed from the images. The aggregate image 340 may be further processed so as to identify locations of defective sensor elements based on their corresponding pixels in the aggregate image 340. Such information about the locations of defective sensor elements may be used to make or update a sensor element condition map 360. In an example embodiment, aggregate image 340 and sensor element condition map 360 may be processed in parallel by the processor.

While the optical imaging system is in-focus, e.g., beginning at $t_2$, a payload image 380 may be captured. The payload image 380 may be a single image, a series of images (burst), or a video stream. The payload image 380 capture may be triggered by a user (e.g., by pushing a shutter button) or it may be triggered automatically. In an example embodiment, payload image 380 may be captured immediately after the end of the AF process so as to minimize shutter delay. As illustrated in FIG. 3E, the payload image 380 may be captured while the aggregate image 340 and the sensor element condition map 360 are still being processed. However, the payload image 380 may be alternatively captured at other times.

Subsequent to capturing the payload image 380 and the sensor element condition map 360 being processed, the payload image 380 may be corrected so as to provide a corrected payload image 382. In an example embodiment, the payload image 380 may be adjusted based on the sensor element condition map 360. For instance, values of pixels in the payload image that correspond to defective sensor elements in the sensor element condition map 360 may be replaced by an average of values of neighboring pixels. In other words, a brightness value of pixels in the payload image 380 representing a signal from defective sensor elements may be replaced by an average value of surrounding and/or adjacent pixels in the payload image 380. As an example, the replacement value may be an average of the value of four nearest neighbor pixels (e.g., pixels directly to the right, left, up, and down relative to the pixel corresponding to the defective sensor element). Additionally or alternatively, the replacement value may be an average of the value of eight nearest neighbor pixels (e.g., pixels further including the "corner" pixels to the upper left, upper right, lower left, and lower right). Other substitute pixel values and sets of neighboring pixels are possible.

In an example embodiment, the corrected payload image 382 may be displayed via a multi-element display of the optical image system. Additionally or alternatively, the corrected payload image 382 may be stored in memory and/or transmitted to another device.

While FIG. 3E illustrates a particular order and arrangement of the various operations described herein, it is understood that the specific timing sequences and exposure durations may vary. Furthermore, some operations may be omitted, added, and/or performed in parallel with other operations.

III. Example Methods

Figure 4:
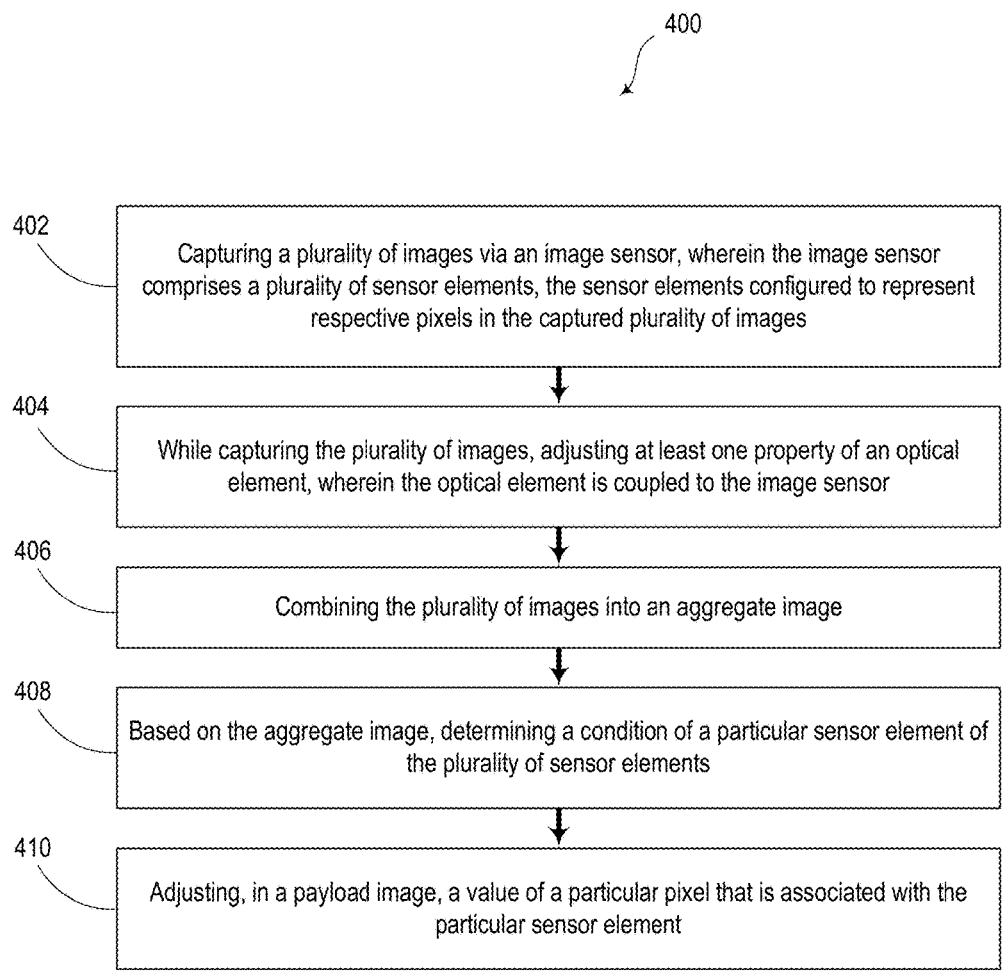
FIG. 4 illustrates a method, according to an example embodiment.

FIG. 4 illustrates a method 400, according to an example embodiment. The method 400 may include various blocks or steps. The blocks or steps may be carried out individually or in combination. The blocks or steps may be carried out in any order and/or in series or in parallel. Further, blocks or steps may be omitted or added to method 400.

Some or all blocks of method 400 may involve elements of optical imaging system 100 or digital camera device 200 as illustrated and described in reference to FIGS. 1, 2A, and 2B. For example, some or all blocks of method 400 may be carried out by controller 150 and/or processor 152 and memory 154. Furthermore, some or all blocks of method 400 may be similar or identical to operations illustrated and described in relation to FIGS. 3A-3E.

Block 402 includes capturing a plurality of images via an image sensor. The image sensor includes a plurality of sensor elements and the sensor elements are configured to represent respective pixels in the captured plurality of images.

Optionally, the method may include metering a field of view of the image sensor prior to, or while capturing the plurality of images. Based on the metering, a shutter speed and a sensitivity of the image sensor may be selected with which to capture the plurality of images.

Block 404 includes, while capturing the plurality of images, adjusting at least one property of an optical element. The optical element is coupled to the image sensor. In some embodiments, adjusting the optical element may include one or more of: adjusting a field of view of the optical element, adjusting a zoom setting of the optical element, adjusting an aperture setting of the optical element, or adjusting a focus position of the optical element.

As described elsewhere herein, adjusting the optical element may be performed during an AF process. That is, a position of the optical element may be adjusted with respect to the image sensor so as to achieve a different focus distance setting for each image of the plurality of captured images.

Block 406 includes combining the plurality of images into an aggregate image. In an example embodiment, combining the plurality of images into the aggregate image may include averaging corresponding pixel values of the plurality of images. Generally, the process of aggregation and/or averaging provided a reduction in random noise in the aggregate image, as compared to any of the individual images. Furthermore, the combination of the plurality of images into the aggregate image makes the detection of defective/occluded sensor elements more reliable.

Block 408 includes based on the aggregate image, determining a condition of a particular sensor element of the plurality of sensor elements. As an example, the determined condition may include one or more of: a functional sensor element, a hot sensor element, a dark sensor element, or an occluded sensor element.

In an example embodiment, determining the condition of a particular sensor element may include comparing a value of the respective pixel to that of at least one neighboring pixel in the aggregate image. Additionally, the determination may include determining, based on the comparison, that a difference between the respective pixel and the at least one neighboring pixel is above a predetermined threshold.

Optionally, the method may also include mapping the determined condition in a sensor element condition map. That is, upon identifying a defective or occluded sensor element, that sensor element's condition may be associated with a corresponding location in a map that includes information indicative of similar defective/occluded sensor elements on the image sensor. Captured images may be corrected by adjusting the value of pixels that correspond to defective/occluded sensor elements in the sensor element condition map.

Block 410 includes adjusting, in a payload image, a value of a particular pixel that is associated with the particular sensor element. In an example embodiment, adjusting the value of the particular pixel may include setting the value of the particular pixel to a corresponding value of at least one neighboring pixel. Additionally or alternatively, adjusting the value of the particular pixel may include setting the value of the particular pixel to a corresponding average value of a plurality of neighboring pixels.

Figure 5A:
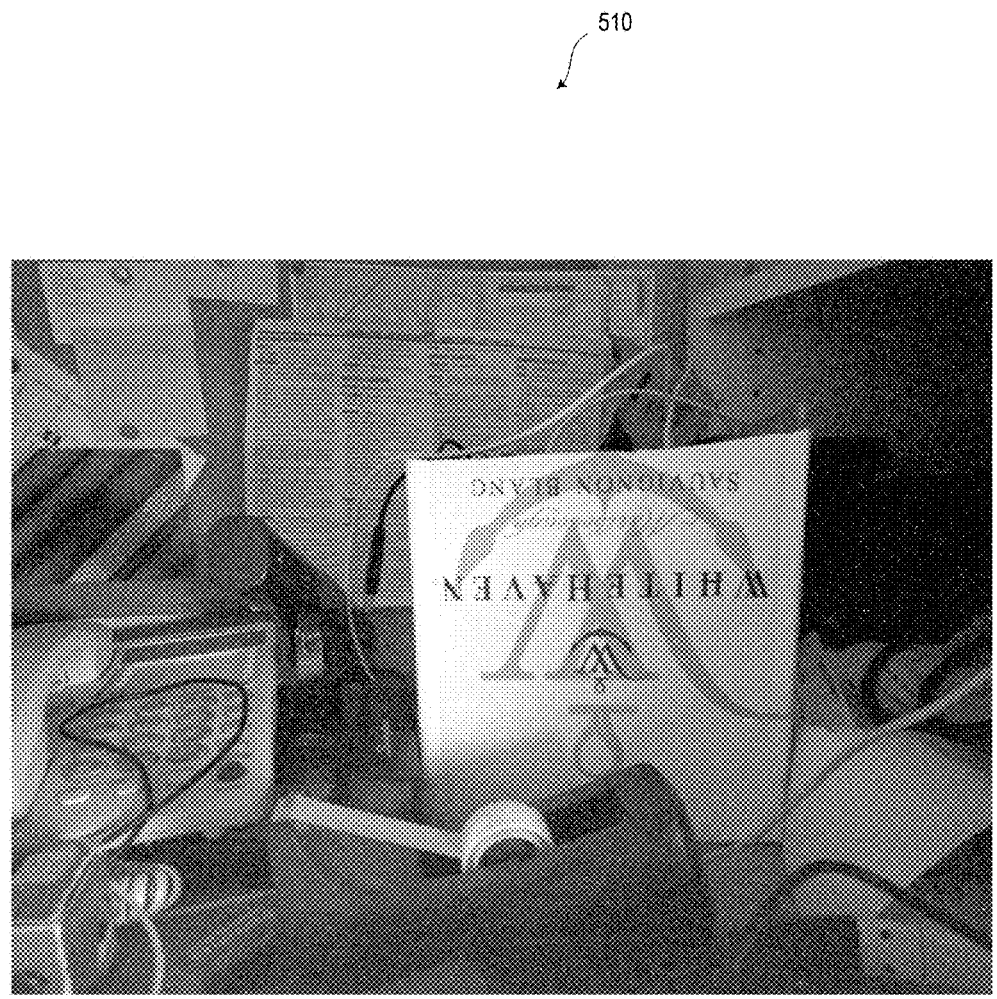
FIG. 5A illustrates an image captured by a digital camera device, according to an example embodiment.

FIG. 5A illustrates an image 510 captured by a digital camera device, according to an example embodiment. Image 510 may have been captured using a relatively high ISO. Furthermore, the image 510 includes a number of hot pixels and possibly cold or occluded pixels.

Figure 5B:
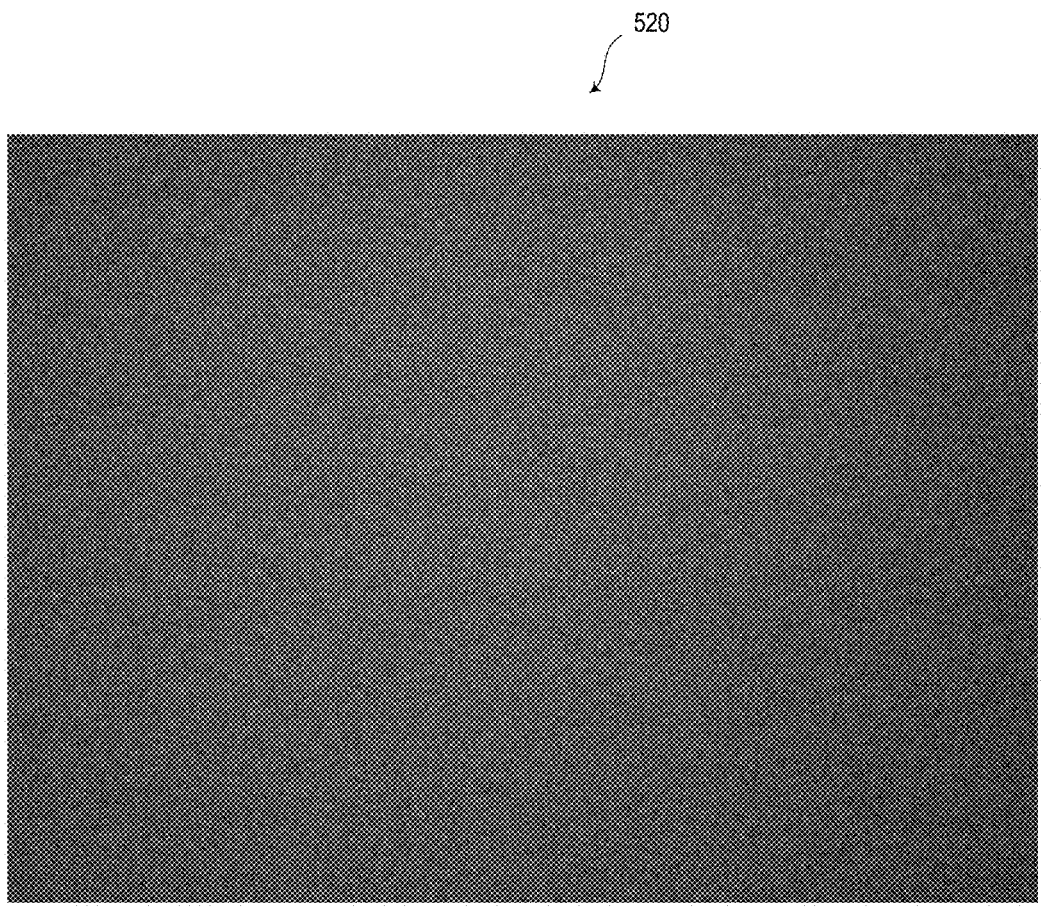
FIG. 5B illustrates an image captured by a digital camera device, according to an example embodiment.

FIG. 5B illustrates an image 520 captured by a digital camera device, according to an example embodiment. Image 520 may have been captured using a relatively high ISO in a dark environment. As such, image 520 includes significant noise and it may prove difficult to identify defective or occluded pixels based on differences in brightness levels.

Figure 5C:
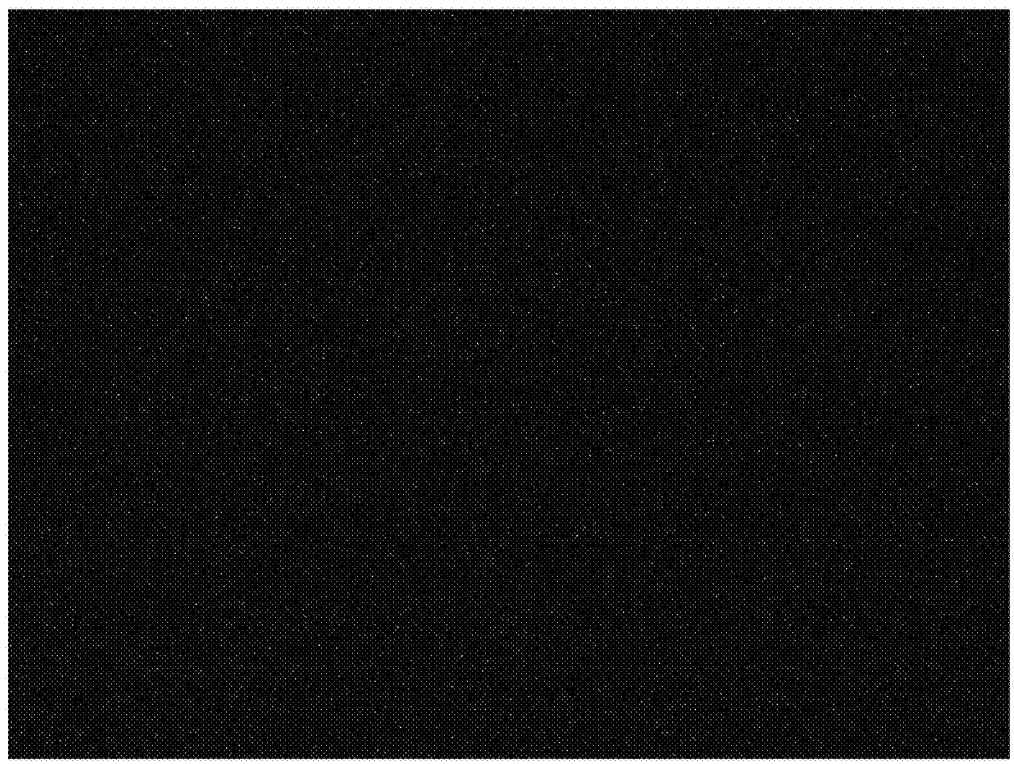
FIG. 5C illustrates an image captured by a digital camera device, according to an example embodiment.

FIG. 5C illustrates an image 530 captured by a digital camera device, according to an example embodiment. Image 530 may have been captured in a dark environment with a long exposure time and/or relatively low ISO. Accordingly, the noise level is much less than that of image 520. As such, hot/dead/stuck pixels are much easier to identify. However, long exposure times and/or user interaction to create the dark environment (e.g., put on a lens cap) are both undesirable.

Figure 5D:
FIG. 5D illustrates an aggregate image of a scene captured by a digital camera device, according to an example embodiment.

FIG. 5D illustrates an aggregate image 540 of a scene captured by a digital camera device, according to an example embodiment. The aggregate image 540 may have been captured using at least some of the method blocks illustrated and described with regard to FIG. 4. For example, the aggregate image 540 may have been merged from a plurality of images captured during an AF process.

Figure 5E:
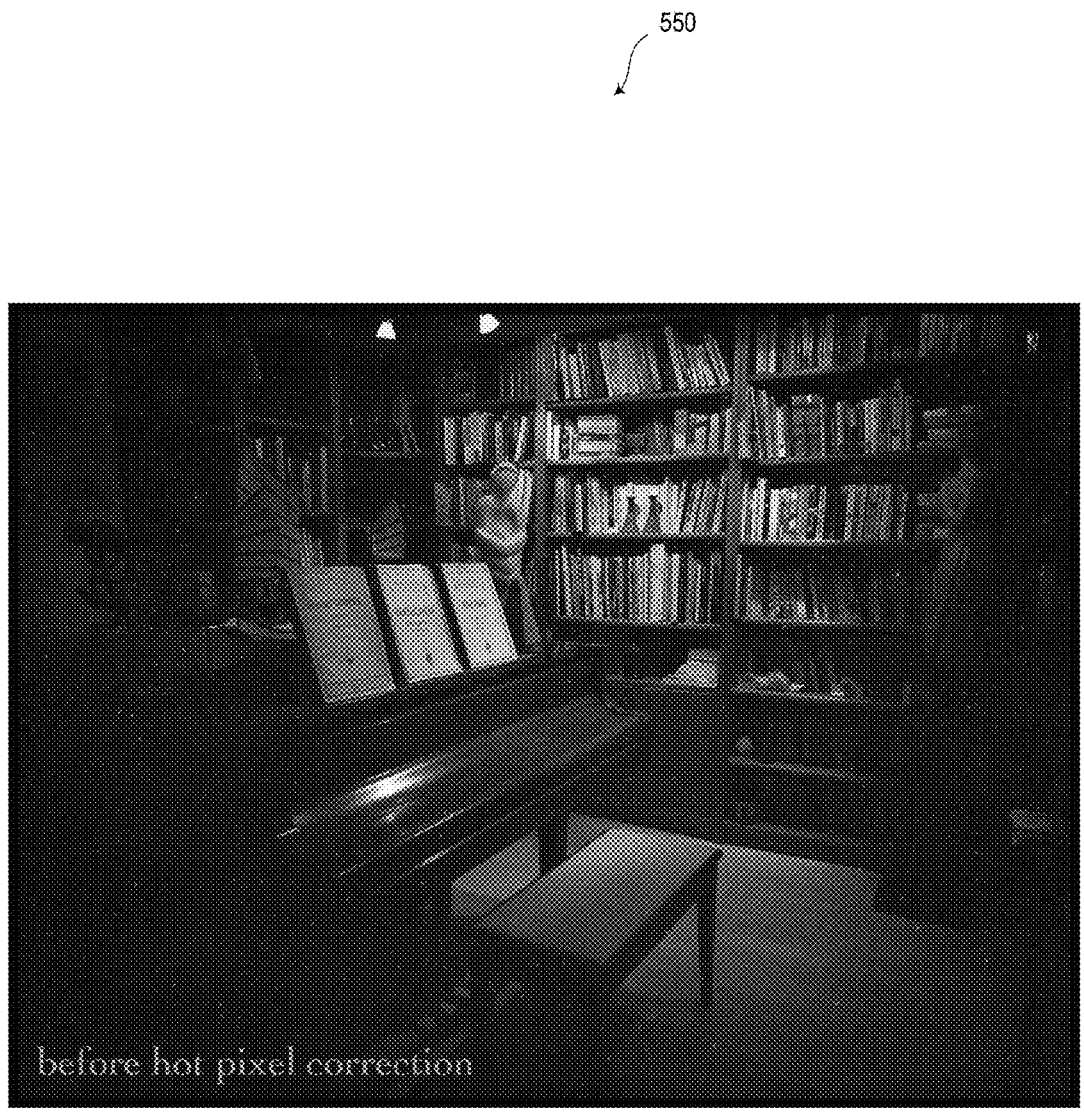
FIG. 5E illustrates a payload image captured by a digital camera device, according to an example embodiment.

FIG. 5E illustrates a payload image 550 captured by a digital camera device, according to an example embodiment. The payload image 550 may be captured subsequent to the AF process or may be one of the plurality of images captured during the AF process. As can be observed in FIG. 5E, the payload image 550 includes a substantial amount of defects (in the form of white spots) due to hot pixels.

Figure 5F:
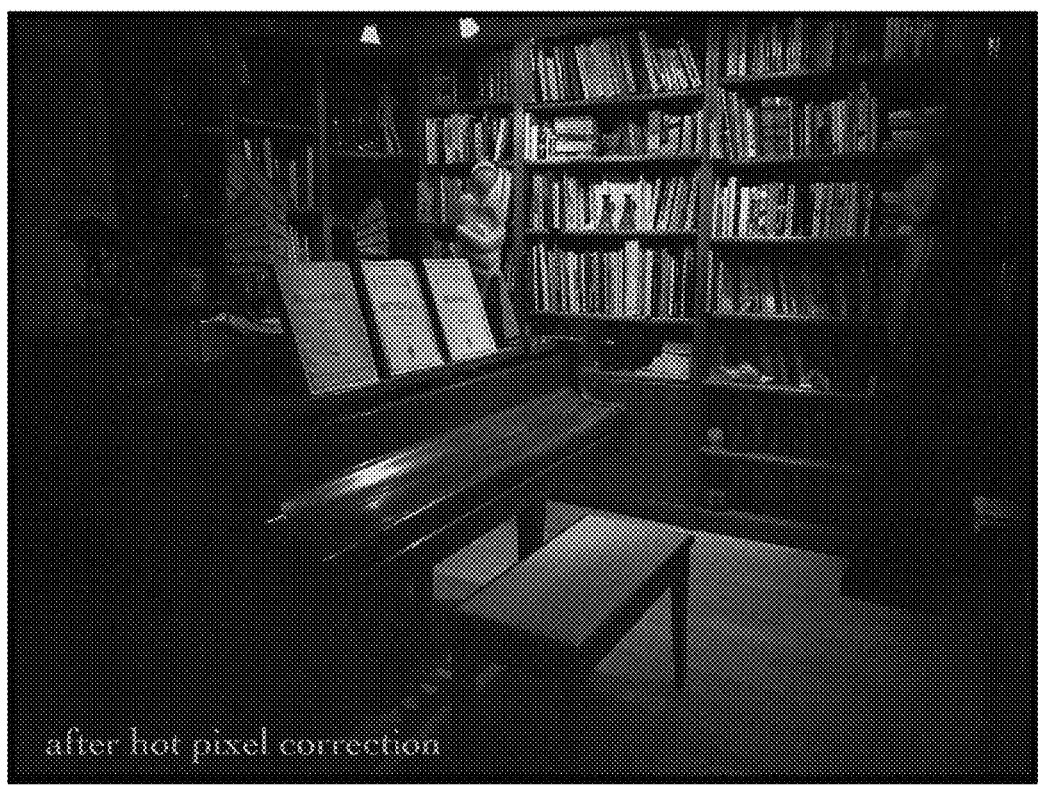
FIG. 5F illustrates a corrected payload image, according to an example embodiment.

FIG. 5F illustrates a corrected payload image 560, according to an example embodiment. The corrected payload image 560 may be corrected based on a sensor element condition map created from identifying defective/occluded sensor elements from the aggregate image 540. Pixels in the payload image 550 corresponding to defective/occluded sensor elements in the sensor element condition map may be adjusted by replacing their respective values with a value of a neighboring pixel and/or an average value of neighboring pixels so as to form the corrected payload image 560.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. An optical imaging system comprising:
  an image sensor comprising a plurality of sensor elements, the sensor elements configured to represent respective pixels in captured images;
  an optical element coupled to the image sensor and configured to define a focus distance setting of the captured images; and
  a controller comprising a memory and at least one processor, wherein the processor is configured to execute instructions stored in the memory so as to carry out operations, the operations comprising:
    causing the image sensor to capture a plurality of images, the images captured with different respective focus distance settings defined by the optical element;
    combining the plurality of images into an aggregate image;
    based on the aggregate image, determining a condition of a particular sensor element of the plurality of sensor elements;
    causing the image sensor to capture a payload image; and
    adjusting, in the payload image, a value of a particular pixel that is associated with the particular sensor element.

2. The optical imaging system of claim 1, wherein the operations further comprise metering a field of view of the image sensor and, based on the metering, selecting a shutter speed and a sensitivity of the image sensor with which to capture the plurality of images.

3. The optical imaging system of claim 1, wherein the operations further comprise mapping the determined condition in a sensor element condition map, and wherein adjusting the value of the particular pixel is based on the sensor element condition map.

4. The optical imaging system of claim 3, wherein the operations further comprise associating the sensor element condition map with a time and providing a historical record of a plurality of sensor element condition maps associated with a corresponding plurality of different times, and wherein adjusting the value of the particular pixel is further based on the historical record.

5. The optical imaging system of claim 1, wherein causing the image sensor to capture a plurality of images comprises causing the image sensor to carry out an autofocus process, wherein the autofocus process comprises adjusting a position of the optical element with respect to the image sensor to achieve the different respective focus distance settings for the respective images.

6. The optical imaging system of claim 1, wherein combining the plurality of images into the aggregate image comprises averaging associated pixel values of the plurality of images.

7. The optical imaging system of claim 1, wherein determining the condition of a particular sensor element comprises:
  comparing a value of a pixel in the aggregate image and associated with the particular sensor element to that of at least one neighboring pixel in the aggregate image; and
  determining, based on the comparison, that a difference between the pixel and the at least one neighboring pixel is above a predetermined threshold.

8. The optical imaging system of claim 1, wherein the determined condition comprises at least one of: a non-defective sensor element, a hot sensor element, a dark sensor element, or an occluded sensor element.

9. The optical imaging system of claim 1, wherein adjusting the value of the particular pixel comprises setting the value of the particular pixel based on a corresponding value of at least one neighboring pixel.

10. The optical imaging system of claim 1, wherein adjusting the value of the particular pixel comprises setting the value of the particular pixel to a corresponding average value of a plurality of neighboring pixels.

11. A method comprising:
capturing a plurality of images via an image sensor, wherein the image sensor comprises a plurality of sensor elements, the sensor elements configured to represent respective pixels in the captured plurality of images;
while capturing the plurality of images, adjusting at least one property of an optical element, wherein the optical element is coupled to the image sensor;
combining the plurality of images into an aggregate image;
based on the aggregate image, determining a condition of a particular sensor element of the plurality of sensor elements; and
adjusting, in a payload image, a value of a particular pixel that is associated with the particular sensor element.

12. The method of claim 11, wherein adjusting the at least one property of the optical element comprises at least one of: adjusting a field of view of the optical element, adjusting a zoom setting of the optical element, adjusting an aperture setting of the optical element, or adjusting a position of the optical element.

13. The method of claim 11 further comprising metering a field of view of the image sensor and, based on the metering, selecting a shutter speed and a sensitivity of the image sensor with which to capture the plurality of images.

14. The method of claim 11 further comprising mapping the determined condition in a sensor element condition map, and wherein adjusting the value of the particular pixel is based on the sensor element condition map.

15. The method of claim 11 wherein adjusting the at least one property of the optical element comprises causing the optical element to carry out an autofocus process, wherein the autofocus process comprises adjusting a position of the optical element with respect to the image sensor to provide different respective focus distance settings for each respective image.

16. The method of claim 11 further comprising combining the plurality of images into the aggregate image comprises averaging associated pixel values of the plurality of images.

17. The method of claim 11, wherein determining the condition of a particular sensor element comprises:
comparing a value of the respective pixel to that of at least one neighboring pixel in the aggregate image; and
determining, based on the comparison, that a difference between the respective pixel and the at least one neighboring pixel is above a predetermined threshold.

18. The method of claim 11, wherein the determined condition comprises at least one of: a non-defective sensor element, a hot sensor element, a dark sensor element, or an occluded sensor element.

19. The method of claim 11, wherein adjusting the value of the particular pixel comprises setting the value of the particular pixel to a corresponding value of at least one neighboring pixel.

20. The method of claim 11, wherein adjusting the value of the particular pixel comprises setting the value of the particular pixel to a corresponding average value of a plurality of neighboring pixels.

* * * * *